United States Patent
Miyagawa et al.

(10) Patent No.: US 8,056,616 B2
(45) Date of Patent: Nov. 15, 2011

(54) EXHAUST HEAT RECOVERY APPARATUS

(75) Inventors: Masashi Miyagawa, Ichinomiya (JP);
Kimio Kohara, Nagoya (JP)

(73) Assignee: Denso Corporation, Kariya (JP)

( * ) Notice: Subject to any disclaimer, the term of this patent is extended or adjusted under 35 U.S.C. 154(b) by 946 days.

(21) Appl. No.: 12/069,797

(22) Filed: Feb. 13, 2008

(65) Prior Publication Data

US 2008/0196865 A1    Aug. 21, 2008

(30) Foreign Application Priority Data

Feb. 15, 2007   (JP) ................. 2007-035328

(51) Int. Cl.
*F28F 3/06*    (2006.01)
(52) U.S. Cl. .............. 165/104.14; 165/166; 165/179
(58) Field of Classification Search .......... 165/165, 165/166, 170, 177, 179, 104.14, 104.21; 361/700
See application file for complete search history.

(56) References Cited

U.S. PATENT DOCUMENTS

| 4,705,102 | A | * | 11/1987 | Kanda et al. | 165/104.33 |
| 5,105,540 | A | * | 4/1992 | Rhodes | 29/890.043 |
| 2004/0149425 | A1 | * | 8/2004 | Abiko et al. | 165/166 |
| 2007/0119581 | A1 | * | 5/2007 | Kato | 165/177 |

FOREIGN PATENT DOCUMENTS

| JP | 58055687 | * | 4/1983 |
| JP | 04-045393 | | 2/1992 |

* cited by examiner

*Primary Examiner* — Teresa Walberg
(74) *Attorney, Agent, or Firm* — Harness, Dickey & Pierce, PLC

(57) ABSTRACT

An exhaust heat recovery apparatus includes an evaporation unit and a condensation unit communicated with the evaporation unit such that an operation fluid circulates therein. The evaporation unit is disposed in a first fluid passage through which a first fluid flows, and performs heat exchange between the first fluid and the operation fluid, thereby evaporating the operation fluid. The condensation unit is disposed in a second fluid passage through which a second fluid flows, and performs heat exchange between the second fluid and the operation fluid. The exhaust heat recovery apparatus further includes a wet area increasing member in a tube of the evaporation unit for increasing a wet area of the operation fluid due to surface tension of the operation fluid. The wet area increasing member is disposed adjacent to an inner surface of the tube and has extension surfaces extending in directions intersecting with the inner surface.

11 Claims, 3 Drawing Sheets

EXHAUST HEAT RECOVERY APPARATUS

CROSS REFERENCE TO RELATED APPLICATION

This application is based on Japanese Patent Application No. 2007-35328 filed on Feb. 15, 2007, the disclosure of which is incorporated herein by reference.

FIELD OF THE INVENTION

The present invention relates to an exhaust heat recovery apparatus.

BACKGROUND OF THE INVENTION

It is known to recover heat of exhaust gas exhausted from an exhaust system of a vehicular engine based on the principle of heat pipe and use the recovered heat for other purposes such as for warming up the engine. As an example of an exhaust heat recovery apparatus, Japanese Unexamined Patent Application Publication No. 4-45393 describes a looped heat pipe heat exchanger.

The disclosed heat exchanger includes a closed looped circulation passage filled with an internal heat-transfer fluid, an evaporation unit disposed on the circulation passage for evaporating the internal heat-transfer fluid therein by receiving external heat and a condensation unit disposed on the circulation passage at a position higher than the evaporation unit for performing heat exchange between the evaporated internal heat-transfer fluid and an external heat-transfer fluid.

In such a heat exchanger, efficiency is improved by increasing the surface area for boiling the internal heat-transfer fluid in an evaporation unit. To increase the boiling surface area, for example, it is proposed to form grooves on inner surfaces of tubes of the evaporation unit by cutting.

In fact, the evaporation unit is subjected to a high temperature environment. Therefore, the tubes of the evaporation unit need to have strength and to be resistant to oxidizing. To form the grooves on the inner surfaces of the tubes by cutting, it is necessary to increase the thickness of tube walls. The increase of the thickness of the tube walls results in an increase of weight and a reduction of yields. Further, in the case that the grooves are formed on the inner surfaces of the tubes by cutting, the tube walls need to have sufficient thickness in consideration of stress applied thereto.

SUMMARY OF THE INVENTION

The present invention is made in view of the foregoing matter, and it is an object of the present invention to provide an exhaust heat recovery apparatus having an evaporation unit that has a sufficient surface area for boiling an operation fluid and is capable of improving productivity and yields.

According to an aspect of the present invention, an exhaust heat recovery apparatus includes an evaporation unit and a condensation unit that is communicated with the evaporation unit such that an operation fluid circulates in the evaporation unit and the condensation unit. The evaporation unit is disposed in a first fluid passage through which a first fluid flows, and performs heat exchange between the first fluid and the operation fluid, thereby evaporating the operation fluid. The condensation unit is disposed in a second fluid passage through which a second fluid flows, and performs heat exchange between the second fluid and the operation fluid, thereby condensing the operation fluid. The exhaust heat recovery apparatus further includes a wet area increasing member for increasing a wet area of the operation fluid due to surface tension of the operation fluid. The wet area increasing member is disposed in a tube of the evaporation unit at a position adjacent to an inner surface of the tube. The wet area increasing member has a plurality of extension surfaces extending in directions intersecting with the inner surface of the tube.

Accordingly, the wet area of the operation fluid in the tube is increased by the wet area increasing member, which is provided as a separate member. That is, the surface area for boiling and evaporating the operation fluid is increased without processing the tube such as by cutting. Further, because the structure of the tube is simplified, productivity and yields improve.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

First Embodiment

Figure 1:
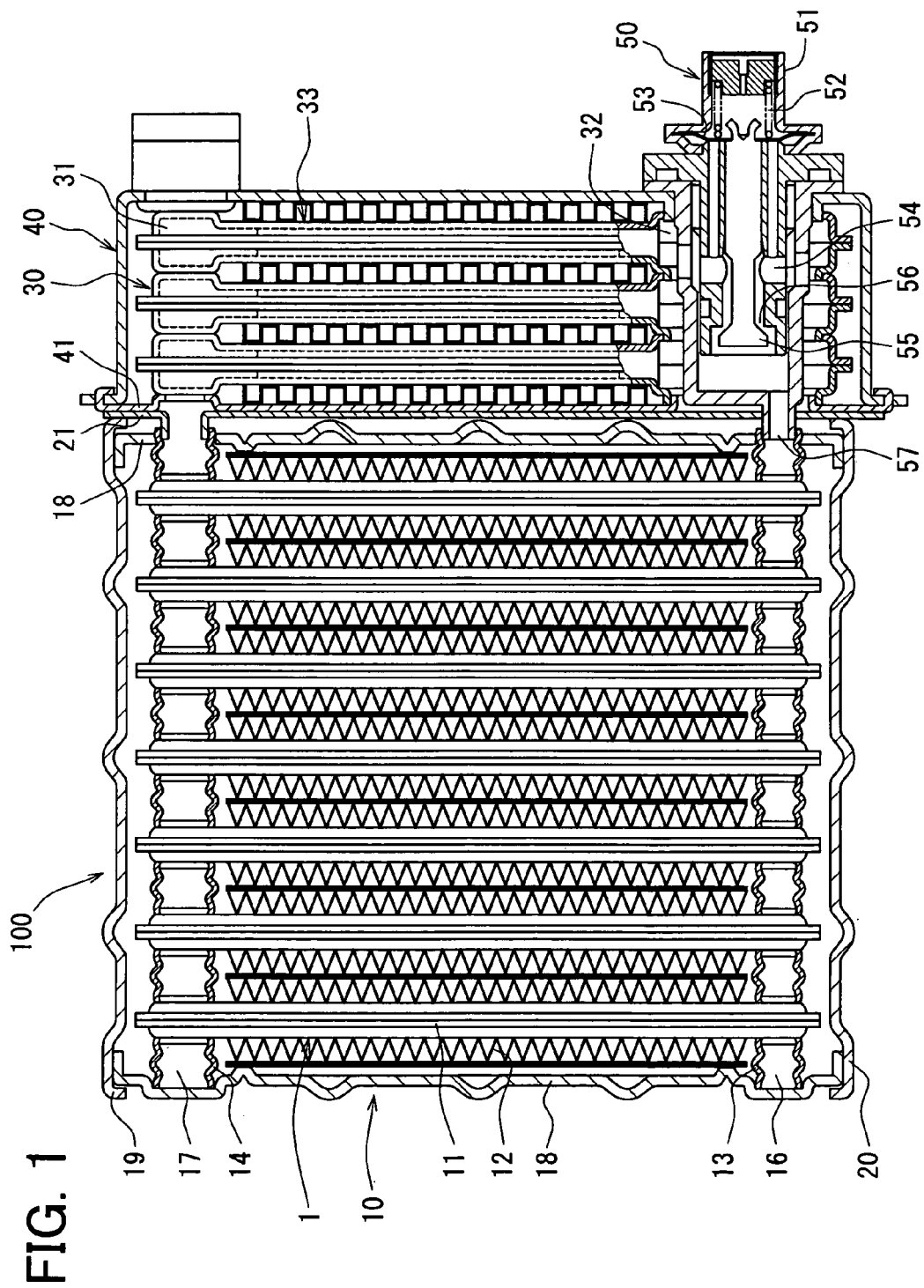
FIG. 1 is a schematic cross-sectional view of an exhaust heat recovery apparatus according to a first embodiment of the present invention.

Referring to FIG. 1, an exhaust heat recovery apparatus 100 of the first embodiment is, for example, employed in a vehicle that is driven by an engine, such as a water-cooled internal combustion engine. The exhaust heat recovery apparatus 100 is disposed on an exhaust heat recovery circuit through which an engine coolant flows and an engine exhaust pipe through which an exhaust gas generated by fuel combustion flows to be exhausted from the vehicle.

The engine is in communication with a radiator circuit through which an engine coolant flows for cooling the engine, the exhaust heat recovery circuit as a circuit separated from the radiator circuit, and a heater circuit through which the coolant flows as a heat source for heating air for an air conditioning operation.

The exhaust heat recovery circuit diverges from an engine outlet portion of the radiator circuit. That is, the exhaust heat recovery circuit diverges from the radiator circuit at a position downstream of the engine. The exhaust heat recovery circuit is coupled to a water pump for circulating the coolant therein.

A water tank 40 of the exhaust heat recovery apparatus 100 is in communication with the exhaust heat recovery circuit. In other words, the water tank 40 is disposed on the exhaust heat recovery circuit.

As shown in FIG. 1, the exhaust heat recovery apparatus 100 generally includes an evaporation unit 10, a condensation unit 30, and a valve unit 50. The evaporation unit 10, the condensation unit 30 and the valve unit 50 are coupled in a predetermined manner so that a passage of an operation fluid is formed in the form of loop. That is, the evaporation unit 10, the condensation unit 30 and the valve unit 50 form a looped heat pipe heat exchanger. The evaporation unit 10 is provided with a plurality of evaporation-side heat pipes 1 filled with the operation fluid.

The operation fluid is, for example, water. In general, the water boils at 100° C. in 1 atmosphere. In the present embodiment, for example, the inside pressure of the heat pipes 1 is reduced to 0.01 atmosphere so that the boiling temperature of the water in the heat pipes 1 is about 5° C. to 10° C. The operation fluid is not limited to water, but may be any evaporative and condensable fluids such as alcohol, fluorocarbon and the like.

Because the exhaust heat recovery apparatus 100 is used in a high temperature environment (e.g., over 800° C.), component parts of the exhaust recovery apparatus 100 are made of a material that is highly resistant to high temperature and corrosion, such as a stainless material. The component parts are assembled and then heated such that the component parts are brazed at joining portions and engagement portions thereof by a brazing material. Namely, the exhaust heat recovery apparatus 100 is formed by integrally brazing the component parts.

The evaporation unit 10 is disposed on an exhaust gas passage through which the exhaust gas exhausted from the engine flows. Thus, the evaporation unit 10 performs heat exchange between the exhaust gas and the operation fluid flowing in the heat pipes 1, thereby to evaporate the operation fluid.

The evaporation unit 10 includes tubes 11 constructing the heat pipes 1, fins 12 and the like. Each tube 11 has a flat tubular shape. The tube 11 is disposed such that its longitudinal axis extends in a vertical direction, such as, in up and down direction in FIG. 1. The tubes 11 are stacked or layered in a horizontal direction, such as in a right and left direction of FIG. 1, at predetermined intervals. Further, the tubes 11 are arranged in rows in a direction substantially perpendicular to a flow direction of the exhaust gas, such as in a direction perpendicular to a paper surface of FIG. 1.

Lower ends of the tubes 11 are in communication with a lower header 13, and upper ends of the tubes 11 are in communication with an upper header 14. The lower header 13 has a substantially tubular shape and forms tube holes to which the lower ends of the tubes 11 are joined. Likewise, the upper header 14 has a substantially tubular shape and forms tube holes to which the upper ends of the tubes 11 are joined.

Thus, the tubes 11 are in communication with each other through lower communication portions 16 defined in the lower header 13. Further, the tubes 11 are in communication with each other through upper communication portions 17 defined in the upper header 14. In other words, the inside of the lower header 13 is in communication with the inside of the upper header 14 through the tubes 11.

The fins 12 are, for example, corrugate fins that are formed from thin plate members. The fins 12 are joined to outer surfaces of the tubes 11. Side plates 18 are joined to outermost fins 12, which are located at the left and right ends in FIG. 1. Side plates are provided as reinforcement members and fixing members.

Further, a lower plate 20 is disposed under the lower header 13, and an upper plate 19 is disposed above the upper header 14. The lower plate 20 is spaced from the lower header 13 by a predetermined distance in the longitudinal direction of the tubes 11, and joined to the side plates 18. The upper plate 19 is spaced from the upper header 14 by a predetermined distance in the longitudinal direction of the tubes 11, and joined to the side plates 18.

That is, the side plates 18, the upper plate 19 and the lower plate 20 form a case having a substantially rectangular-shaped cross-section, as shown in FIG. 1a. The case forms a passage space through which the exhaust gas flows. The case forms a part of the exhaust gas passage, or is in communication with the exhaust gas passage. The exhaust gas flows through the passage space in a direction substantially perpendicular to the paper surface of FIG. 1.

The water tank 40 is constructed by joining a water tank plate 41 and a water tank member. The water tank plate 41 is a generally flat plate member, and is disposed adjacent to the evaporation unit 10. The water tank member has a substantially U-shaped cross-section. Thus, the water tank 40 has a generally container shape that extends in a direction parallel to the longitudinal direction of the tubes 11.

A thermal insulation plate 21 is disposed between the right side plate 18 and the water tank plate 41 to form a thermal insulation layer between the evaporation unit 10 and the condensation unit 30. For example, the thermal insulation plate 21 is spaced from the right side plate 18 by a predetermined distance. Also, the water tank plate 41 is joined to the thermal insulation plate 21 on a side opposite to the right side plate 18.

The condensation unit 30 and the valve unit 50 are disposed in the water tank 40. The condensation unit 30 is disposed on a coolant passage through which the engine coolant flows. The condensation unit 30 performs heat exchange between the operation fluid, which has been evaporated in the evaporation unit 10, and the coolant, thereby to condense the operation fluid.

The condensation unit 30 is located on a side of the evaporation unit 10 (e.g., right side in FIG. 1). The condensation unit 30 has a plurality of tubes 33. The tubes 33 are arranged such that longitudinal exes thereof extend in the up and down direction, similar to the tubes 11 of the evaporation unit 10. Fins are joined to outer surfaces of the tubes 11 for facilitating heat transfer.

Upper ends of the tubes 33 are coupled to an upper tank part 31, and lower ends of the tubes 33 are coupled to a lower tank part 32. The upper tank part 31 is in communication with the upper communication portions 17 of the evaporation unit 10, and thus the tubes 33 are in communication with the tubes 11.

The valve unit 50 is disposed in the lower tank part 32, that is, located at a position downstream of the condensation unit 30 with respect to a flow of the operation fluid. The valve unit 50 has a condensed fluid outlet 57 that is directly connected to the lower header 13 of the evaporation unit 10. The condensed fluid outlet 57 is in communication with the tubes 11 through the communication portions 13 of the lower header 13.

The valve unit 50 includes a diaphragm-type controlling structure for controlling, such as opening and closing, a passage according to the inside pressure of the heat pipes 1, that is, the pressure of the operation fluid. The valve unit 50 includes a case 51, a diaphragm 53, a spring 52 and a valve body 55. The diaphragm 53, the spring 52 and the valve body 55 are housed in the case 51. For example, the case 51 is a substantially cylindrical container and is constructed of two cases.

The case 51 is formed with a communication hole at an axial end thereof to allow the inside of the case 51 to communicate with atmosphere. Further, the case 51 is formed with a condensed fluid inlet 54 on its axial side wall. The condensed fluid outlet 57 is formed at the opposite axial end of the case 51. A gate portion (valve seating) is formed between the condensed fluid inlet 54 and the condensed fluid outlet 57. The gate portion has an opening 56 at the center.

The diaphragm 53 is displaceable in the axial direction of the valve body 55 due to a difference between a force that is generated by atmospheric pressure from the communication hole and elasticity of the spring 52 and a force that is generated by the inside pressure of the condensation unit 30 exerted through the condensed fluid inlet 54. The valve body 55 is connected to the diaphragm 53. The valve body 55 moves in the axial direction in synchronization with an axial displacement of the diaphragm 53, thereby to open and close the opening 56.

The valve unit 50 is inserted into the lower tank part 32 from a side of the water tank 40 such that the condensed fluid outlet 57 is connected to the lower header 13 of the evaporation unit 10. Also, the valve unit 50 is arranged such that a portion of the case 51 in which the diaphragm 53, the spring 52 and the like is housed projects outside from the side of the water tank 40.

Figure 2:
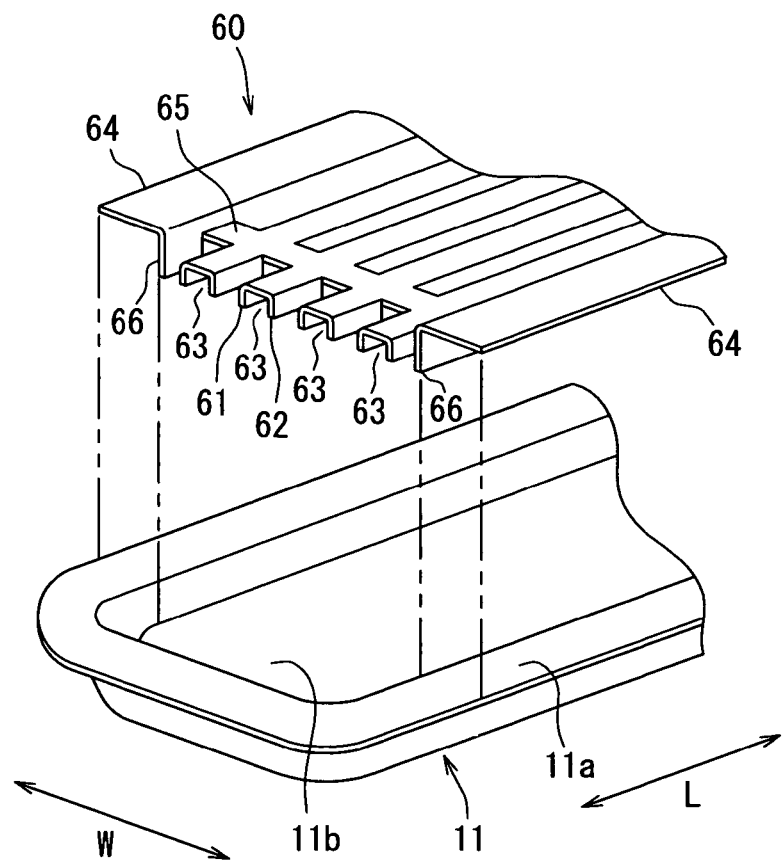
FIG. 2 is a schematic perspective view of a tube of an evaporation unit of the exhaust heat recovery apparatus according to the first embodiment.
Figure 3:
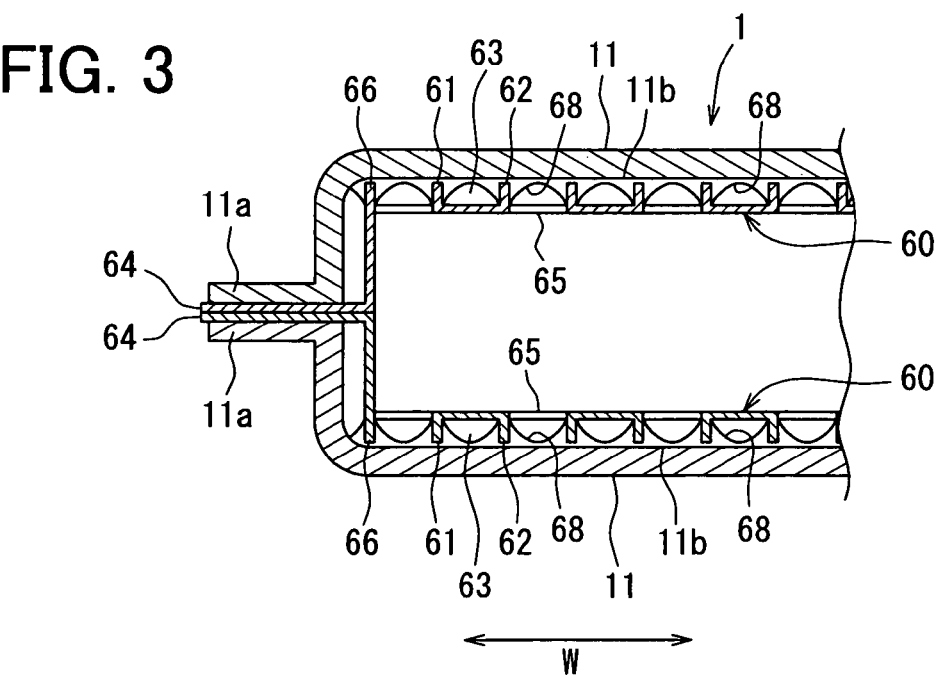
FIG. 3 is a cross-sectional view of a part of the tube of the evaporation unit according to the first embodiment.

Next, an inner structure of the tube 11 of the evaporation unit 10 will be described with reference to FIGS. 2 to 4. In the drawings, an arrow L represents a lengthwise direction (longitudinal direction) of the tube 11, the lengthwise direction being parallel to the longitudinal axis of the tube 11. An arrow W represents a widthwise direction of the tube 11, the widthwise direction being perpendicular to the longitudinal axis of the tube 11. In FIG. 3, a direction perpendicular to the paper surface of FIG. 3 corresponds to the lengthwise direction L of the tube 11. Also, an up and down direction in FIG. 4 corresponds to the lengthwise direction L of the tube 11.

The tube 11 has a groove member 60 on which grooves are formed, as a wet area increasing member. In the tube 11, the groove member 60 is disposed adjacent to an inner surface 11b of the tube 11. In the present embodiment, for example, each tube 11 has two groove members 60. As shown in FIG. 3, the groove members 60 are correspondingly arranged adjacent to opposed inner surfaces 11b of the tube 11, the opposed inner surfaces 11b being opposed to each other across a middle portion (inner space) of the tube 11. Also, the groove members 60 are arranged to occupy only areas adjacent to the inner surfaces 11b, in the tube 11.

In other words, the groove members 60 are disposed only adjacent to the inner surfaces 11b of the tube 11 such that the groove members 60 are wetted with the operation fluid and thus a wet area (surface area) of the operation fluid increases at positions adjacent to the inner surfaces 11b. The groove member 60 serves to increase the wet area of the operation fluid due to the surface tension of the operation fluid. The groove member 60 is configured such that the operation fluid is adhered on the groove member 60 and the surface area of the operation fluid is increased.

For example, the tube 11 includes a pair of tube plates (cups) having a substantially cup shape. The tube 11 is formed by placing the groove members 60 correspondingly on the tube plates, and joining the tube plates such that the inner surfaces 11b thereof are opposed to each other through the groove members 60.

Each cup-shaped tube plate includes a main wall that has a substantially rectangular shape and defines the inner surface 11b, a side wall extending from four sides of the main wall, and a flange 11a extending from the side wall in an outward direction and parallel to the main wall. Thus, the cup-shaped tube plate has a substantially U-shaped cross-section. The cup-shaped tube plate is, for example, formed from a plate member by pressing using a press device. The cup-shaped tube plate is, for example, made of stainless steel or the like.

The groove member 60 generally includes flange portions 64, guides 66, ribs 61, 62 and the like. The flange portions 64 are overlapped with the flange 11a when the groove members 60 are arranged to the tube plates. The guides 66 extend along the side wall of the tube. That is, the guides 66 extend in a direction that intersects with a plane of the main wall of the tube plate, such as, in a direction of the depth of the cup-shaped tube plate. The ribs 61, 62 extend toward the inner surface 11b.

Each flange portion 64 has a width that is substantially equal to a width of the flange 11a in the widthwise direction W. The flange portion 64 has a length that is substantially equal to the length of the flange 11a in the lengthwise direction L. Each guide 66 extends from an inner end of the flange portion 64 and forms an angle (e.g., right angle) with the flange portion 64. For example, the guide 66 is bent perpendicularly from the flange portion 64 and extends toward the inner surface 11b.

When the groove member 60 is placed on the tube plate, the guide 66 is inserted along the side wall of the tube plate. That is, the guide 66 serves to position the groove member 60 to the tube plate with respect to the widthwise direction W.

The ribs 61, 62 extend toward the inner surface 11b. The ribs 61, 62 have side surfaces (extension surfaces) extending toward the inner surface 11b, that is, in directions intersecting with the inner surface 11b. In the present embodiment, for example, the ribs 61, 62 are substantially perpendicular to the inner surface 11b, and the side surfaces are substantially perpendicular to the inner surface 11b.

For example, the ribs 61, 62 are formed by pressing from a plate member. The ribs 61, 62 are arranged at predetermined intervals in the widthwise direction W. Each of the ribs 61, 62 has a length that is substantially equal to the length of the inner surface 11b in the lengthwise direction L.

The rib 61 is located next to the rib 62 in the widthwise direction W. Ends of the adjacent ribs 61, 62 are separated from each other, the end being adjacent to the inner surface 11b. That is, the ribs 61, 62 are open at least at the ends thereof.

The rib 61 and the rib 62 form a groove 63 with a connecting portion that extends between the rib 61 and the rib 62. The groove 63 has a substantially U-shape in a cross-section defined in the widthwise direction W. The groove 63 extends in the lengthwise direction L and has a length substantially equal to the length of the inner surface 11b. That is, the groove 63 is formed substantially entirely over the length of the inner surface 11b. The depth of the rib 61, 62, that is, a dimension of the rib 61, 62 in a direction perpendicular to the inner surface 11b is, for example, approximately 0.3 mm to 0.5 mm. For example, a thickness of the groove member 60 at a position corresponding to the main wall of the tube plate is smaller than a half of a distance between the opposed inner surfaces 11b. Also, a clearance is provided between the groove members 60 in the middle portion of the tube 11, for example.

The rib 61 of one groove 63 and the rib 62 of the adjacent groove 63 are connected through a bridge portion 65. Further, all the ribs 61, 62 are connected through the bridge portion 65 extending in the widthwise direction W. All the ribs 61, 62 and the guides 66 are integrally formed. The groove member 60 has slits between the adjacent grooves 63, at positions other than the bridge portions 65. Thus, the inner surface 11b is in communication with the inner space of the tube 11, that is, the middle portion of the tube 11 through the slits without having any obstacles. Thus, the operation fluid can smoothly flows through the slits.

The groove member 60 has at least two bridge portions 65 with respect to the lengthwise direction L. Each bridge portion 65 extends in the widthwise direction W. The groove member 60 forms a substantially U-shaped cross-section such as a bowl-like cross-section with the flange portions 64, the guides 66 and the grooves 63 that extend along the inner surface 11b.

The ribs 61, 62 are disposed such that the ends thereof are in contact with the inner surface 11b or spaced from the inner surface 11b at a predetermined distance, in a condition that the groove member 60 is connected to the tube 11.

In the evaporation unit 10, the operation fluid evaporates in the heat pipe 1 and flows in the communication portions 17. Also, the liquefied operation fluid is adhered to the inner surfaces 11b of the tubes 11. The operation fluid adhered to the inner surfaces 11b is not only accumulated on the inner surfaces 11b, but also forms wet surfaces 68 on bottom surfaces of the grooves 63, the bottom surfaces defining the bottoms of the grooves 63 and facing the inner surfaces 11b.

Specifically, the operation fluid adhered to the inner surfaces 11b reaches the base portions of the ribs 61, 62 from the ends of the ribs 61, 62 while wetting the surfaces of the ribs 61, 62 due to capillary action, the ends being adjacent to the inner surfaces 11b. Further, the operation fluid forms the wet surfaces 68 between the ribs 61, 62. The wet surfaces 68 have the curved shape protruding toward the inner surfaces 11b due to the surface tension, as shown in FIG. 3. Since the wet surfaces 68 are formed, a surface area for heating and boiling the operation fluid is increased. Therefore, efficiency of heat exchange improves.

Figure 4:
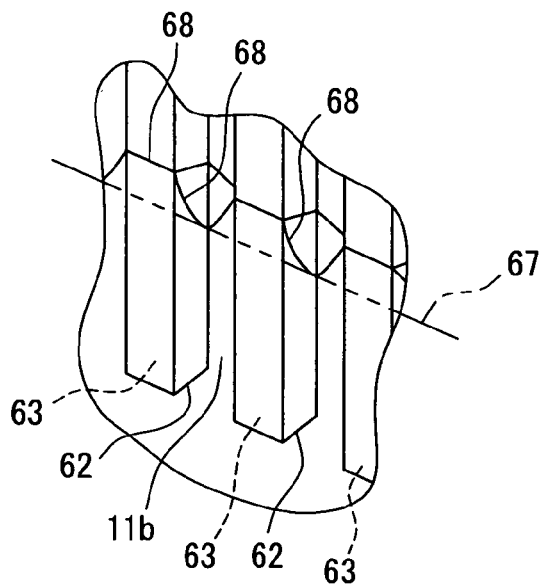
FIG. 4 is a perspective view of a part of a groove member disposed in the tube of the evaporation unit, for showing a condition where the groove member is wetted with an operation fluid, according to the first embodiment.

The operation fluid is accumulated at the lower portion of the tube 11, as shown in FIG. 4. In FIG. 4, a double-dashed chain line 67 shows a water level of the operation fluid in the middle portion of the tube 11, that is, on the side opposite to the inner surface 11b with respect to the groove member 60 within the tube 11. When viewed from the middle portion of the tube 11, the water level rises toward the inner surface 11b and the side surfaces of the ribs 61, 62. That is, the wet surfaces 68 as shown in FIG. 4 are formed in the middle portion of the tube 11, that is, on the side opposite to the inner surface 11b.

In other words, the wet surfaces 68 are formed not only on the outer side of the groove member 60 but also on the inner side of the groove member 60, the outer side facing the inner surface 11b and the inner side facing the inside of the tube 11. As such, the wet surface area further increases.

The groove member 60 is, for example, formed by pressing a roll member having a predetermined length using a press device or the like. The groove member 60 is fixed to the tube 11 by brazing the flange portions 64 with the flange 11a.

The cup-shaped tube plates and the groove members 60 are made of a material that is highly resistive to corrosion, such as a stainless material. The tubes 11 and the groove members 60 are assembled to each other in a predetermined manner, and then integrally brazed by melting the brazing material disposed on contact portions and engagement portions between them and cooling after the melting.

Next, an operation of the exhaust heat recovery apparatus 100 will be described. The water pump is operated when the engine is started. Thus, the engine coolant circulates through the radiator circuit, the exhaust heat recovery circuit and the heater circuit. The exhaust gas from the engine is discharged to the atmosphere through the exhaust pipe and the evaporation unit 10 of the exhaust heat recovery apparatus 100. Further, the coolant flowing through the exhaust heat recovery circuit passes through the condensation unit 30 of the water tank 40.

After the engine is started, the temperature of the engine coolant increases, and the inner pressure of the heat pipes 1 gradually increases. The operation fluid inside of the heat pipes 1 receives heat from the exhaust gas flowing through the evaporation unit 10 and starts boiling and evaporating. Thus, the evaporated operation fluid flows upwardly in the tubes 11 and flows in the upper tank part 31 of the condensation unit 30 through the communication portions 17.

In the condensation unit 30, the evaporated operation fluid is cooled by the coolant flowing through the tank 40, and is condensed. The condensed operation fluid further flows to the communication portions 16 of the evaporation unit 10 through the condensed fluid inlet 54, the opening 56 and the condensed fluid outlet 57. As such, the operation fluid circulates in the evaporation unit 10 and the condensation unit 30.

Namely, the heat of the exhaust gas is transferred to the operation fluid, and thus introduced from the evaporation unit 10 to the condensation unit 30. The heat is released as latent heat of condensation when the evaporated operation fluid is condensed in the condensation unit 30. Thus, the engine coolant flowing through the exhaust heat recovery circuit is heated. Accordingly, the heat of the exhaust gas is used for facilitating the warming up of the engine. As such, the friction loss of the engine is reduced, and the increase in fuel for improving cold-starting is reduced. Therefore, fuel efficiency improves.

In the present embodiment, the tubes 11 of the evaporation unit 10 are provided with the groove members 60 that has a structure capable of being wetted with the operation fluid and thus increasing the surface area of the operation fluid. The groove members 60 are correspondingly disposed adjacent to the inner surfaces 11b that are opposed to each other within the tubes 11. Further, the groove members 60 have the ribs 61, 62 extending toward the inner surfaces 11b.

In this case, the wet area in the tube 11 is increased by providing the separate members in the tubes 11. That is, the wet area is increased without cutting the inner surface of the tubes 11. Therefore, the wall thickness of the cup-shaped tube plate is reduced. Also, the cup-shaped tube plate has a simple structure. As such, productivity and yields of the tubes 11 improve.

Also, it is not necessary to form the grooves on the inner surface by working such as cutting. That is, accurate cutting work is not necessary. Therefore, productivity improves and the wet surfaces are securely formed.

The ribs 61, 62 are formed by working from the plate member. The adjacent ribs 61, 62 are not connected at least at the ends thereof, the ends being adjacent to the inner surfaces 11b of the tubes 11. That is, the ends of the adjacent ribs 61, 62 are open. In this case, both the surfaces of the ribs 61, 62 are wet by the operation fluid. Therefore, the wet area further increases.

Second Embodiment

A second embodiment of the present invention will be described with reference to FIG. 5. In the second embodiment, the tube 11 has a groove plate 70 as the wet area increasing member, in place of the groove member 60 of the first embodiment. Hereinafter, components similar to those of the first embodiment will be indicated by the same numerals and will not be described further. In the present embodiment, components and structures of the exhaust heat recovery apparatus 100 other than the wet area increasing member are similar to those of the first embodiment. Thus, the similar effects as the first embodiment will be provided also in the present embodiment.

Figure 5:
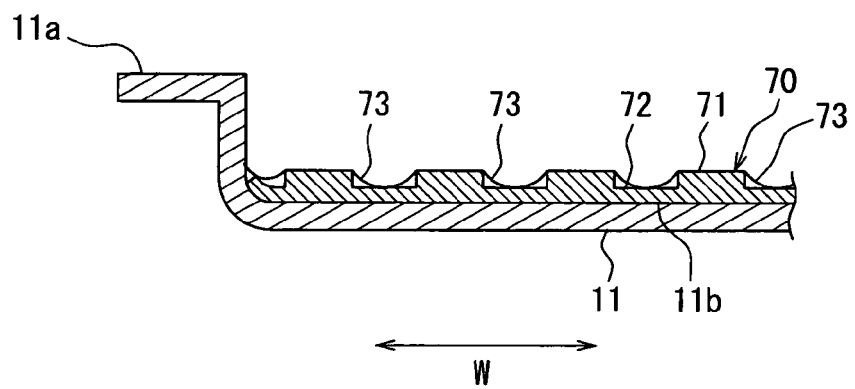
FIG. 5 is a cross-sectional view of a part of a groove plate disposed in a tube of an evaporation unit of an exhaust heat recovery apparatus according to a second embodiment of the present invention.

As shown in FIG. 5, the groove plate 70 is a plate member and has projections 71 and grooves 72. The projections 71 and the grooves 72 are alternately arranged in the widthwise direction W. The projections 71 and the grooves 72 extend in the lengthwise direction L, and have the substantially equal length to the length of the inner surface 11*b*. Side walls (extension surfaces) of the projections 71 form inner walls of the groove 72. The side walls of the projections 71 extend toward the inner surface 11*b*, that is, in directions intersecting with a plane of the inner surface 11*b*. Also, slits may be formed in the longitudinal direction of the grooves 72 such as by punching. The dimension of the projection 71 from the base end to the top end is, for example, approximately 0.2 mm to 0.5 mm.

Further, the slits may be formed to extend mostly in the longitudinal direction of the grooves 72, and bridge portions connecting the projections 71 that are arranged in the widthwise direction W may be formed at plural positions. In this case, only the slits are formed on the plate member by pressing such as punching. For example, the plate member has a thickness approximately 0.2 mm to 0.5 mm.

The groove plate 70 is formed by pressing a roll material having a predetermined length using a pressing device or the like. That is, the projections 71, the grooves 72, the slits and the like are formed on the groove plate 70 by pressing.

In the example shown in FIG. 5, the projections 71 and the grooves 72 are formed on the inner side of the groove plate 70, the inner side facing the inner space of the tube 11. The projections 71 and the grooves 72 can be formed on the outer side of the plate as well, the outer side facing the inner surface 11*b*. Also, the thickness of the groove plate 70 is smaller than the half of the distance between the opposed inner surfaces 11*b*, for example.

Each of the tubes 11 is, for example, constructed of the pair of cup-shaped tube plates, similar to the first embodiment. The groove plates 70 are correspondingly disposed to the tube plates. The tube 11 is formed by joining the cup-shaped tube plates at the flanges 11*a*.

The operation fluid adhered to the inner surface 11*b* is not only accumulated on the inner surface 11*b*, but also reaches the top end of the projections 71 while wetting the side walls of the projections 71 due to the capillary action. Thus, the operation fluid forms concaved wet surfaces 73 in the grooves 72, as shown in FIG. 5. Since the wet surfaces 73 are formed, the surface area for heating and boiling the operation fluid increase. As such, efficiency of heat exchange improves.

In the present embodiment, the groove plates 70 are disposed adjacent to the inner surfaces 11*b* of the cup-shaped tube plates, and the tube plates are joined to each other at the flanges 11*a*. Accordingly, it is not necessary to form the wet surface increasing portion by cutting the tube plates. Thus, the tubes 11 having the wet area increasing members with simple structure are formed with improved yield and productivity.

Further, the groove plates 70 can be joined to the inner surfaces 11*b* of the tube 11. Also in this structure, the heating area of the operation fluid increases, and productivity and yield of the tube 11 improve.

Third Embodiment

Figure 6:
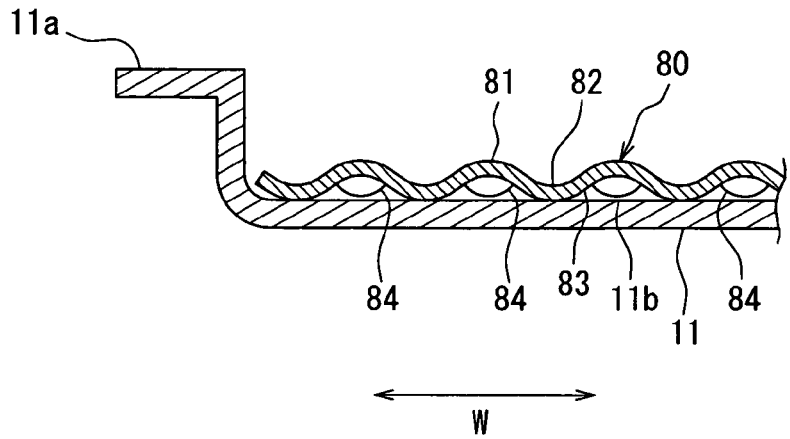
FIG. 6 is a cross-sectional view of a part of a waved plate disposed in a tube of an evaporation unit of an exhaust heat recovery apparatus according to a third embodiment of the present invention.

A third embodiment of the present invention will be described with reference to FIG. 6. In the third embodiment, the tubes 11 have waved plates 80 as the wet area increasing members. Component parts and structures of the exhaust heat recovery apparatus 100 other than the wet area increasing members are similar to those of the first embodiment. Thus, the similar effects as the first embodiment will be provided also in the third embodiment.

The wave plate 80 has a wave form and alternately forms projections 81 and grooves 82 in the widthwise direction W. The projections 81 and the grooves 82 extend in the lengthwise direction L and have the substantially equal length as the length of the inner surface 11*b*. Further, slits may be formed in the longitudinal direction of the projections 81 by pressing such as punching.

The wave plate 80 is formed by pressing a roll material using a pressing device or the like. That is, the projections 81, the grooves 82, the slits and the like are formed by pressing the roll material.

Also in the present embodiment, the tube 11 is constructed by joining the pair of cup-shaped tube plates. The wave plates 80 are placed along both the cup-shaped tube plates, and the cup-shaped tube plates are joined at the flange 11*a*.

The operation fluid adhered to the inner surface 11*b* is not only accumulated on the inner surface 11*b*, but also wet a rear surface of the wave plate 80 due to the capillary action, the rear surface facing the inner surface 11*b* of the tube 11. Specifically, the operation fluid wets rear surfaces of the projections 81 while flowing from the rear surfaces of the grooves 82 toward the rear surfaces of the projections 81. As a result, wet surfaces 84, which has a substantially convex shape protruding toward the inner surface 11*b*, are formed on rear spaces of the projections 81, the rear spaces being formed between the rear surfaces of the projections 81 and the inner surface 11*b*. Since the wet surfaces 84 are formed, the surface area for heating and evaporating the operation fluid increase. Thus, efficiency of heat exchange improves.

On the rear side of the wave plate 80, the rear side facing the inner surface 11*b*, the walls extending from the grooves 82 toward the projections 81 provide surfaces (extension surfaces) extending toward the inner surface 11*b*, that is, extending in directions intersecting with the plane of the inner surface 11*b*. Each of the surfaces forms an acute angle with the inner surface 11*b* so that the wet surface 84 is easily formed. It is preferable that the angle is as small as possible.

When the operation fluid is accumulated in the lower portion of the tube 11, the front side of the wave plate 80 is wetted by the accumulated operation fluid, the front side being opposite to the rear side and facing the inner side of the tube 11. For example, the water level of the accumulated operation fluid rises from the inner side of the tube 11 toward the inner surface 11*b* and the side walls of the projections 81 and the grooves 82. That is, the wet surfaces that rises toward the inner surface 11*b* and the side walls of the projections 81 and the grooves 82 are formed. Accordingly, the wet area is increased on both the rear side and the front side of the wave plate 80.

In the present embodiment, the wet area increasing members are provided by the wave plates 80 that are formed by pressing the plate members. The wave plates 80 are correspondingly disposed along the inner surfaces 11*b* of the cup-shaped tube plates, and the tube plates are joined at the flange 11*a*. Accordingly, it is not necessary to form the wet area increasing portions by cutting the tube plates. Thus, the tubes 11 having the wet area increasing members with simple structure are formed with improved yield and productivity.

Further, the wave plates 80 can be joined to the inner surfaces 11*b* of the tube 11. Also in this structure, the heating area of the operation fluid increases, and productivity and yield of the tube 11 improve.

Other Embodiments

The exemplary embodiments of the present invention are described in the above. However, the present invention is not limited to the above described embodiments, but may be implemented various other ways without departing from the spirit of the invention.

For example, the wet area increasing members are not limited to the groove plates 60, 70 and the wave plate 80. The wet area increasing members can be provided any other members that are formed separately from the tube plates and coupled to the tube plates at positions adjacent to the inner surface. That is, the wet area increasing members can be provided by separate members so that it is not necessary to directly process the tube plates such as to directly form grooves on the tube plates.

In the third embodiment, the shape of the wave plate 80 is not limited to continuous wave form and smooth wave form. For example, the wave plate 80 may have zigzag shape, wave shape with corners, and the like. Also in these cases, the similar effects are provided.

In the above embodiments, the two wet area increasing members 60, 70, 80 are disposed in each tube 11 such that the wet area increasing members are correspondingly located adjacent to the opposed inner surfaces 11*b*. However, it is not always necessary that the wet area increasing members are disposed adjacent to both inner surfaces 11*b* of each tube 11. For example, the wet area increasing member can be provided to be adjacent to at least one of the inner surfaces 11*b* of the tube 11.

In the second and third embodiments, the groove plate 70 and the wave plate 80 can have guides and flange portions on the peripheries thereof, similar to the guides 66 and the flange portions 64. Thus, the groove plate 70 and the wave plate 80 are placed to the tube plate by inserting the flange portions between the flanges 11*a* of the tube plates.

Further, use of the exhaust heat recovery apparatus is not limited to a vehicle. The exhaust heat recovery apparatus of the above embodiments may be employed to various other systems for recovering exhaust heat and reusing the recovered heat to other purposes. That is, the exhaust heat recovery apparatus may be disposed such that the evaporation unit 10 is disposed on a first fluid passage for recovering heat of a first fluid and the condensation unit 30 is disposed on a second fluid passage for transferring the recovered heat to a second fluid. Also, the wet area increasing members 60, 70, 80 may be employed to tubes of any other heat exchangers.

Additional advantages and modifications will readily occur to those skilled in the art. The invention in its broader term is therefore not limited to the specific details, representative apparatus, and illustrative examples shown and described.

What is claimed is:

1. An exhaust heat recovery apparatus comprising:
   an evaporation unit disposed in a first fluid passage through which a first fluid flows, the evaporation unit including a tube for defining a passage through which an operation fluid flows, for performing heat exchange between the first fluid and the operation fluid, thereby evaporating the operation fluid;
   a condensation unit in communication with the evaporation unit such that the operation fluid circulates in the evaporation unit and the condensation unit, the condensation unit disposed in a second fluid passage through which a second fluid flows, for performing heat exchange between the second fluid and the operation fluid, thereby condensing the operation fluid; and
   a wet area increasing member for increasing a wet area of the operation fluid due to surface tension of the operation fluid, wherein
   the wet area increasing member for increasing a wet area of the operation fluid due to surface tension of the operation fluid, wherein
   the wet area increasing member is disposed in the tube at a position adjacent to an inner surface of the tube, and has a plurality of extension surfaces, each of which extending in a direction intersecting with the inner surface of the tube, ends of the extension surfaces of the wet area increasing member being spaced from the inner surface of the tube.

2. The exhaust heat recovery apparatus according to claim 1, wherein
   the inner surface is one of inner surfaces that are opposed to each other across an inner space of the tube, and
   the wet area increasing member is disposed adjacent to each of the inner surfaces.

3. The exhaust heat recovery apparatus according to claim 1, wherein
   the wet area increasing member is a substantially plate member having a plurality of ribs projecting toward the inner surface of the tube,
   ends of the plurality of ribs are separate from each other, the ends being adjacent to the inner surface of the tube, and
   the plurality of extension surfaces is provided by surfaces of the plurality of ribs.

4. The exhaust heat recovery apparatus according to claim 1, wherein
   the wet area increasing member has a plurality of projections and a plurality of grooves between the plurality of projections.

5. The exhaust heat recovery apparatus according to claim 1, wherein
   the wet area increasing member has a thickness smaller than a half of a distance between the inner surface and another inner surface that is opposed to the inner surface, and
   the wet area increasing member is disposed along the inner surface such that a clearance is maintained on a side opposite to the inner surface with respect to the wet area increasing member.

6. The exhaust heat recovery apparatus according to claim 1, wherein
   the wet area increasing member has slits between the plurality of extension surfaces, and the inner surface is in communication with an inner space of the tube through the slits.

7. The exhaust heat recovery apparatus according to claim 1, wherein the wet area increasing member defines grooves on both a first side and a second side thereof, the first side facing the inner surface of the tube and the second side being opposite to the first side.

8. The exhaust heat recovery apparatus according to claim 1, wherein the tube is constructed by joining a pair of tube plates at flanges thereof, the wet area increasing member has a flange portion on a periphery thereof, and the flange portion of the wet area increasing member is interposed between the flanges of the pair of tube plates.

9. The exhaust heat recovery apparatus according to claim 1, wherein the first fluid is an exhaust gas exhausted from an engine of a vehicle and the second fluid is an engine coolant.

10. The exhaust heat recovery apparatus according to claim 1, wherein the extension surfaces extend generally perpendicular to the inner surface of the tube.

11. The exhaust heat recovery apparatus according to claim 1, wherein the extension surfaces extend into but not entirely across the passage through which the operation fluid flows.

\* \* \* \* \*